US012602986B2

(12) United States Patent
Kulkarni et al.

(10) Patent No.:  US 12,602,986 B2
(45) Date of Patent:      Apr. 14, 2026

(54) METHODS FOR SETTING ADDRESSES IN A BUILDING MANAGEMENT SYSTEM AND INSTALLATION TOOL FOR SUCH A SYSTEM

(71) Applicant: THORN SECURITY LIMITED, Sunbury-on-Thames (GB)

(72) Inventors: Prasad Kulkarni, Winnersh (GB); Praveen Deshpande, Pune (IN); Faruk Meah, Woking (GB); Nikhil Kulkarni, Pune (IN); Vishal Bhosale, Pune (IN)

(73) Assignee: THORN SECURITY LIMITED, Sunbury-on-Thames (GB)

( * ) Notice: Subject to any disclaimer, the term of this patent is extended or adjusted under 35 U.S.C. 154(b) by 24 days.

(21) Appl. No.: 18/289,339

(22) PCT Filed: May 16, 2022

(86) PCT No.: PCT/GB2022/051228
§ 371 (c)(1),
(2) Date: Nov. 2, 2023

(87) PCT Pub. No.: WO2022/243662
PCT Pub. Date: Nov. 24, 2022

(65) Prior Publication Data
US 2024/0242594 A1      Jul. 18, 2024

(30) Foreign Application Priority Data
May 17, 2021     (GB) ...................................... 2107008

(51) Int. Cl.
*G08B 25/00*       (2006.01)
*G08B 29/04*       (2006.01)
*H04L 61/5038*    (2022.01)

(52) U.S. Cl.
CPC ......... *G08B 25/003* (2013.01); *G08B 29/043* (2013.01); *H04L 61/5038* (2022.05)

(58) Field of Classification Search
CPC .... G08B 25/003; G08B 29/145; G08B 25/14; G06F 30/18; G06F 2113/16; G05B 2219/25011
See application file for complete search history.

(56)          References Cited

U.S. PATENT DOCUMENTS

| | | | | |
|---|---|---|---|---|
| 2015/0142898 A1* | 5/2015 | Piccolo, III | .......... | G08B 25/003 |
| | | | | 709/204 |
| 2016/0148498 A1* | 5/2016 | Ruszala | ............... | G08B 25/003 |
| | | | | 340/506 |

(Continued)

FOREIGN PATENT DOCUMENTS

| | | |
|---|---|---|
| WO | 2020162954 A1 | 8/2020 |
| WO | 2020245686 A1 | 12/2020 |

OTHER PUBLICATIONS

International Search Report and Written Opinion issued in corresponding International Application No. PCT/GB2022/051228 dated Aug. 17, 2022.

*Primary Examiner* — Mirza F Alam
(74) *Attorney, Agent, or Firm* — ArentFox Schiff LLP

(57)          ABSTRACT

A method of setting the address of an addressable network device of a building management system comprises: at the point of installation of the device on a network wiring of the system, operating a code scanner of an installation tool to scan a code on the device, the information in the code including the serial number of the device; collecting location information in the installation tool at the point of installation; connecting the installation tool to a wiring commissioning tool after the device has been installed; downloading the code information and the location information onto the wiring commissioning tool; generating a network address (Continued)

for the device; and setting that network address into the device via the network wiring.

26 Claims, 2 Drawing Sheets

(56) References Cited

U.S. PATENT DOCUMENTS

| | | | |
|---|---|---|---|
| 2021/0396417 A1* | 12/2021 | Ratakonda | .............. F24F 11/58 |
| 2021/0397149 A1* | 12/2021 | Ratakonda | ............. G06F 30/13 |
| 2022/0084390 A1* | 3/2022 | Wadhwani | ........... G08B 25/003 |

\* cited by examiner

METHODS FOR SETTING ADDRESSES IN A BUILDING MANAGEMENT SYSTEM AND INSTALLATION TOOL FOR SUCH A SYSTEM

This application is a 35 U.S.C. § 371 National Phase of International Patent Application No. PCT/GB2022/051228, entitled "METHODS FOR SETTING ADDRESSES IN A BUILDING MANAGEMENT SYSTEM AND INSTAL-LATION TOOL FOR SUCH A SYSTEM," and filed on May 16, 2022, which claims priority to Great Britain Application No. 2107008.1, entitled "METHODS FOR SETTING ADDRESSES IN A BUILDING MANAGEMENT SYS-TEM AND INSTALLATION TOOL FOR SUCH A SYS-TEM" and filed on May 17, 2021, the disclosures of which are expressly incorporated by reference herein in their entireties.

The present invention relates to the setting of a network address in an addressable networked device of a building management system during installation or commissioning of that system. The device might be, for example, a smoke detector where the building management system is a fire alarm system, an access point where the building manage-ment system is a building access control system, or a temperature sensor where the building management system is a ventilation system. The invention also relates to the tools required in the process of setting the network address in the addressable networked device.

Buildings are normally constructed with at least one building management system, a computer-based control system that controls the building's mechanical and electrical equipment, such as fire alarm systems, fire suppression systems, access control systems, security systems, ventila-tion systems, power systems, ventilation systems and gun-shot detection systems. Building management systems include a control panel and a number of addressable net-worked devices connected to the control panel by address-able network wiring. The most common such system is the fire alarm system.

Known fire alarm systems in buildings and other premises include a control panel, often known as control and indi-cating equipment (CIE), from which addressable network wiring loops extend, each end terminating at the control panel. A number of addressable networked devices can be connected to the network loops, such as smoke detectors, fire detectors, sounders, visible strobes, call points, and the like. The network loops are arranged within the building or premises such that the various networked devices are suit-ably positioned within that building or premises to carry out their function. Typically, a network loop is arranged to extend around one floor of a building, or a particular zone of a building.

During installation of a fire alarm system, the cabling of the addressable networked loops is laid out throughout the building or premises with the ends of the loops terminating at the location of the control panel. Where a loop passes the intended location of a networked device, a base unit is installed between the pair of wires in the cable so that the base unit is ready to receive the networked device. The pair of wires in the cable supplies power to the base unit so that the networked device is able to operate once installed in the base unit. The pair of wires also forms an addressable network through which the networked device can be con-trolled by the control panel and through which the device can communicate with the control panel.

Since the system requires addressable devices, each device on a loop must be allocated a device address that relates to, and is unique to the system, and that device address must be set within that device. There are two ways to set the address in a device: manual addressing and auto addressing.

Manual addressing is carried out at the time of installing the devices on the loops for the first time. It requires the installer to use a handheld programming tool, such as the applicant's 850EMT programming tool. Some devices, such as detectors, can be placed on the programming tool so as to form a connection with it, and the tool can be used to set a device address in its memory which is unique to the system. The programming tool can be used to record other informa-tion as well, such as the location at which the device is installed. This information can be downloaded to the control panel later, or included in an installation report. Since the programming tool is portable, it will typically be used to set the address and to record certain other information when the installer is at the position at which the device is to be installed. Other devices may be connected to the program-ming tool using a cable to enable the same process to be followed.

Manual addressing has the advantage that the installer can specify the device address, for example encoding into the device address the location of the device with respect to the loops. For example, the third device on the second loop might be given a device address 203XXX . . . , where the numbers 2 and 03 represent the second loop and the third device on the loop. Manual addressing also has the advan-tage that information about the location of the device can be collected by the installer at the time of installation and subsequently entered by the installer into a PC running console software for downloading onto the control panel later, or into an installation report.

Manual addressing has some disadvantages though, such as that it is time-consuming, and therefore costly, and that it requires a handheld installation tool, which is again costly. Furthermore, the manual addressing process must be com-pleted before devices are connected to the network other-wise it will cause faults later on during the commissioning process.

Auto addressing is a much faster process. It requires the installer simply to connect the devices to the appropriate location on the loop without having set the address of the device beforehand. Once connected to the loop, the control panel automatically enrolls each device into the system over the networked loop, allocating an address to each device and setting that address in the memory of each device according to an algorithm. This is a very efficient process, and saves considerable time and cost in the commissioning process of a fire alarm system. The control panel is able to include in the device address which loop that device is on, but beyond that, the addresses are assigned in a random manner. For example, if the device is on loop 4, the address given to that device might begin with the number 4.

Auto addressing has some disadvantages. Firstly, there is no freedom to assign a particular address to a full fire alarm device. This is a disadvantage because it makes it more difficult to maintain the system in the absence of information on how to locate a particular device. Secondly, the auto addressing process can only be run once the fire alarm control panel has been installed because it is the control panel which carries out the setting of the addresses of the devices. It is advantageous to the commissioning of a fire alarm system to install the control panel some time after the rest of the system has been installed. Thirdly, auto address-ing gives you no information whatsoever about the location of the device which is being installed. The device could be installed on the 2nd floor or on the 5th. The control panel has no idea of the location of devices, unless that is added manually using the 850EMT programming tool mentioned above. This is a problem because, if a fire detector detects a fire, the control panel is not able to indicate where the fire is located. This may cause delays in evacuating people within the building, and in beginning to fight the fire.

Known access control systems in buildings and other premises include a control panel, from which addressable network loops extend, each end terminating at the control panel. A number of addressable networked devices can be connected to the network loops, such as readers located at doors, door sensors, door locks, motion sensors, indicating lights, and the like. The network loops are arranged within the building or premises such that the various networked devices are suitably positioned within that building or premises to carry out their function.

Known ventilation systems in buildings and other premises include a control panel, from which addressable network loops extend, each end terminating at the control panel. A number of addressable networked devices can be connected to the network loops, such as temperature sensors, manual ventilation controls, timers, and the like. The network loops are arranged within the building or premises such that the various networked devices are suitably positioned within that building or premises to carry out their function.

The other types of building management systems are arranged in the same way, but with addressable networked devices specific to the function of that system.

According to a first aspect, the present invention is a method of setting the address of an addressable network device of a building management system, the building management system having network wiring on which addressable network devices can be installed, the method comprising: at the point of installation of the device on the network wiring, operating a code scanner of an installation tool to scan a code on the device, the information in the code including the serial number of the device; collecting location information in the installation tool at the point of installation; connecting the installation tool to a wiring commissioning tool after the device has been installed; downloading the code information and the location information onto the wiring commissioning tool; generating a network address for the device; and setting that network address into the device via the network wiring. This aspect of the invention, like auto addressing, has the advantage that the allocation and setting of a network address into a device is done by a wiring commissioning tool, while allowing the possibility for allocating a device address which has some relationship to the location of the device by virtue of having collected the location information at the point of installation. It also permits the collection of location information at the point of installation for downloading into the wiring commissioning tool so that, for example, when the device is a fire detector of a fire alarm system and a fire is detected by the fire detector, the wiring commissioning tool is able to signal the location of the detector which has signalled the fire.

In the preferred embodiment, the code on the device is a QR code.

Advantageously, operating the installation tool involves operating an application running on a portable computing device. Operation of the code reader may involve operation of a camera of the portable computing device.

It is preferred to associate the location of the portable computing device when the code scanner is operated with the information in the code.

In one arrangement, collecting location information involves operation of a geolocation device of the portable computing device.

Data may be manually input at the point of installation using a user interface located on the mobile computing device, and the manually input data associated with the information in the code.

The user might take a photograph of the installation using a camera located on the mobile computing device, and associate the photograph with the information in the code.

The connection of the installation tool to a wiring commissioning tool may be made by a data interface on the installation tool. Preferably the data interface is a Bluetooth interface.

In one embodiment, the building management system is a fire alarm system.

According to a second aspect of the present application, a building management system installation tool for the installation of an addressable networked device on a network wiring of the system comprises: a code scanner for scanning a machine-readable code information from the addressable networked device; a locator for sourcing location information of the installation tool at the point of installation of the device; and a communication interface for downloading the code information and the location information to a wiring commissioning tool. This aspect of the invention has an advantage that the installation of a device is extremely quick and easy, enabling location information to be collected at the point of installation of the device, and is downloaded to the wiring commissioning tool to permit it to generating network address for the device and to set that network address into the device via the network wiring.

According to a preferred embodiment, the scanner is a camera. It is also preferred that the locator is one of: a GPS device; a geolocator device; and a manual user interface for manual entry of location information.

It is further preferred that the communication interface is a Bluetooth interface.

The tool is, advantageously, a portable computing device and an application arranged to run on the device.

In one embodiment, the building management system is a fire alarm system.

According to a third aspect of the invention, a method of installation of a network device of a building management system, the building management system having network wiring on which devices can be installed, the method comprising: at the point of installation of the device on the network wiring, operating a code scanner of an installation tool to scan a code on the device, the information in the code including the serial number of the device; collecting location information in the installation tool from a geolocator device at the point of installation; connecting the installation tool to a wiring commissioning tool after the device has been installed; downloading the code information and the location information onto the wiring commissioning tool. The use of a geolocation device together with the installation tool permits the position of the device to be identified with very great accuracy, making it easier for someone to find the device, and to distinguish a device from another device on the system where they might be located close to each other.

In the preferred embodiment, the code on the device is a QR code.

Advantageously, operating the installation tool involves operating an application running on a portable computing device. Operation of the code reader may involve operation of a camera of the portable computing device.

It is preferred to associate the location of the portable computing device when the code scanner is operated with the information in the code.

Data may be manually input at the point of installation using a user interface located on the mobile computing device, and the manually input data associated with the information in the code.

The user might take a photograph of the installation using a camera located on the mobile computing device, and associate the photograph with the information in the code.

The connection of the installation tool to a wiring commissioning tool may be made by a data interface on the installation tool. Preferably the data interface is a Bluetooth interface In this specification, the phrase "point of installation of the device" is used to refer to a combination of the location of installation of the device on the addressable network wiring and the time at which it is installed in that location. With respect to the location, this is intended to include positions nearby the exact place where the device is attached to the wiring so as to include where an installing technician might work to operate a code scanner of the installation tool and to collect location information in the installation tool of the location of the device once installed. It will be understood that the installing technician will need to be close to the exact place where the devices attached to the wiring in order to collect the location information.

An embodiment of the present invention will now be described by way of example only, with reference to the following drawings in which.

It will be appreciated that a fire alarm system is one type of building management system, and that the invention is not limited to such a system. It applies equally to other types of building management systems, including: fire suppression systems, access control systems, security systems, ventilation systems, power systems, ventilation systems and gunshot detection systems.

Figures 1, 2:
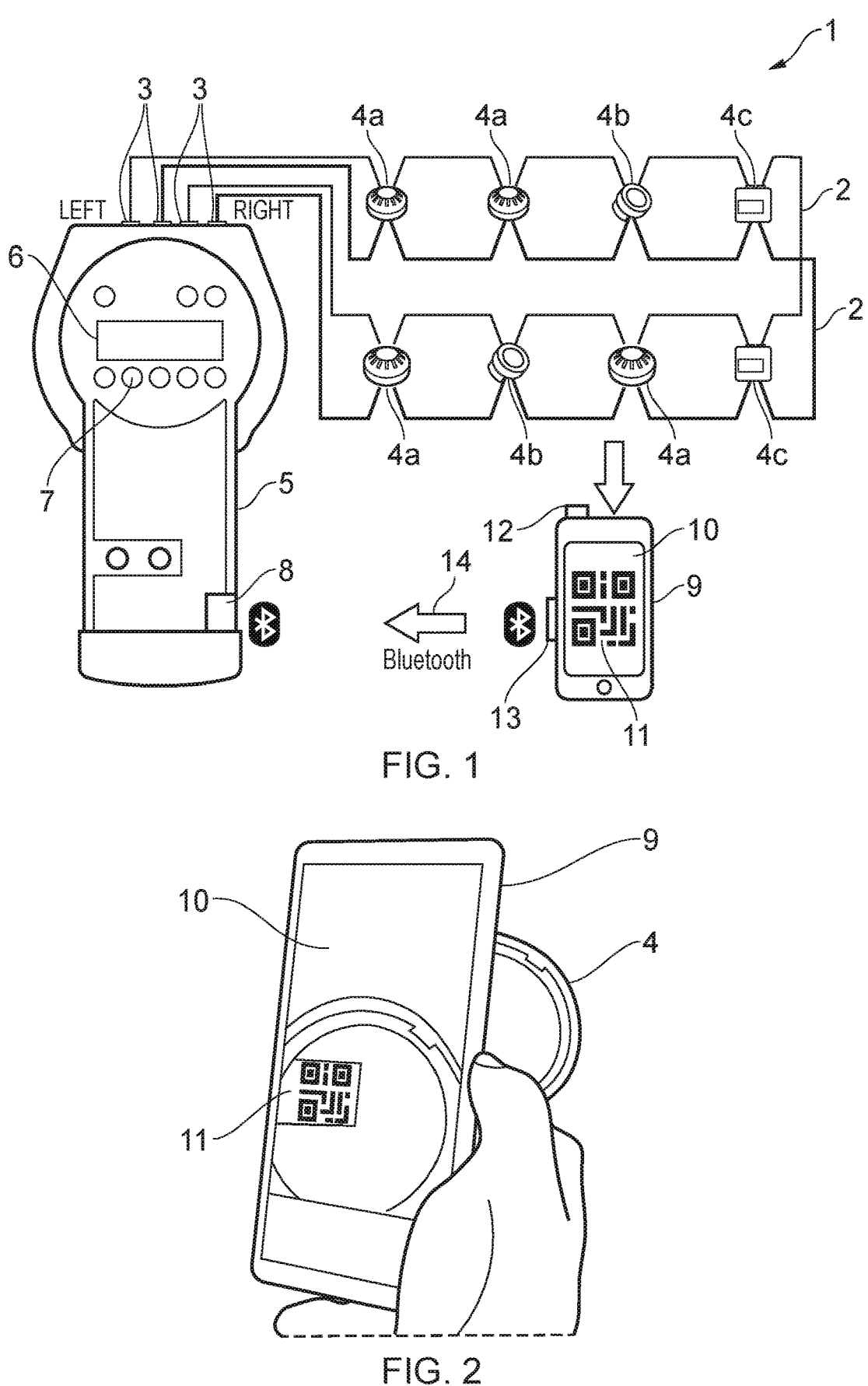
FIG. 1 is a schematic diagram of a fire alarm system and a portable installation tool which forms part of the present application.
FIG. 2 is a drawing showing a portable installation tool in use with respect to an addressable networked device.

Referring first to FIG. 1, a fire alarm system 1 is shown having 2-wire addressable network wiring in the arrangement of a loop 2 with terminals 3, a number of addressable networked devices 4 attached to the addressable network loop 2, and a network loop controller 5 connected to the terminals 3 of the loop 2.

The addressable networked devices 4 can be any of a range of different fire alarm system devices, including sensors such as smoke detectors, heat detectors, fire detectors and like, notification devices such as sounders and strobes, call points, and other components which are typically found on the loop of a fire alarm system. The devices 4 connect between the wires of the loop such that they are powered from the loop and are able to transmit and receive data from other devices on the loop, such as the network loop controller 5. Base units are often connected directly to the wires of the loop, and the devices may then be attached to the base units for easy connection to the network loop at a location defined by the position of the base unit (not shown). The networked devices 4 are equipped with a machine-readable code, in this case, a label attached to the rear of the device carrying a QR code containing the device's serial number, as well as a number of other pieces of advantageous information, such as the detector SKU/PID code, the device's model number, the device's date of manufacture and the like.

In this instance, the network loop controller 5 is a wiring commissioning tool which, when connected to an addressable network loop, is able to test the addressable network loop 2 and the devices 4 which are positioned on the loop 2. If any part of the loop 2 is not connected properly, or if there is a fault with any of the devices 4, the wiring commissioning tool will identify it and indicate the fault in its display 6. The device can be manipulated by an installation technician using input 7 in the form of buttons.

There are advantages to installing the addressable network loop 2 and the devices 4 and testing those components before the control panel is fitted. This is what the wiring commissioning tool is for.

The network loop controller 5 includes a Bluetooth port 8 to enable it to communicate through Bluetooth protocol with other devices. The Bluetooth port 8 could, of course, be a data interface of a different kind, such as a wired interface or Wi-Fi interface.

FIG. 1 also shows a portable installation tool in the form of a smartphone 9. The smartphone 9 has a screen 10, a camera 12 which can be used as a code scanner for scanning machine readable codes, such as QR codes, and a Bluetooth port 13. In this case, the camera 12 has been used to take a photograph of a QR code 11 from one of the devices 4, and the QR code 11 is shown on the screen 10. The smartphone 9 includes a geolocator, not shown, which is able to produce location information as to the position of the smartphone. The Bluetooth port 13 is able to connect to the Bluetooth port 8 of the wiring commissioning tool 5 via Bluetooth connection 14.

The commissioning of a fire alarm system 1 will now be described with particular reference to the installation of the devices 4 on the loop 2 and the allocation of device addresses to the devices such that each device has a has an address generated by the wiring commissioning tool 5 which is set into the device 4 via the network loop 2.

The commissioning process only begins once the addressable network loop 2 is in place, complete with any base units for connection of the addressable networked devices 4. The network loop controller 5 does not need to be connected at this point.

Step 1: an installation technician moves to the location where the first device is to be installed. In this example, the technician is going to install the devices 4 on the second loop, beginning at one end of the loop and working around to the opposite end of the loop. At the point of installation, the technician switches his smartphone, on which is installed with an application for installation of devices. The technician selects the device which is to be installed at that point of installation, and using the camera 12 of the smartphone 9 as a QR code scanner, scans the QR code which is located on the back of the device 4 as is shown in FIG. 2. The QR code 11 is shown on the screen 10 of the smartphone 9. The QR code contains information about the device, including the serial number of the device, the detector SKU/PID code, the detector model number, the detector date of manufacture and the like.

Step 2: at this point, the location information relating to the point of installation is collected. There are two ways to do this, and preferably both are used. The simplest way is that the smartphone is geo-located using the geolocator of the smartphone, so that it automatically knows the location and records that location as the location of the point of installation. The other way to collect this information is to collect it manually, where the technician enters the location of the point of installation into the smartphone user interface, for example "Office 2.12". An advantage of collecting the location information automatically is that this remains true, even if the layout of the building is subsequently changed. An advantage of collecting the location information manually is that the location description entered by a person is likely to be more meaningful to a person who is later trying to understand where the device is located, for example, where the device is a fire alarm and a fire has been signalled by the detector, it will be easier to find the location of the fire.

Step 3: the installation technician can connect the device to the addressable network loop 2. In this example, the location information is collected before the device 4 is connected because the automatic collection of that information takes place at the same time as the QR code is scanned by the smartphone. Since the QR code is located on a label on the back of the device 4, this connection can't occur until after the QR code has been scanned. Of course, were the QR code 11 located on the front of the device 4, this connection could occur before step 1. It will be appreciated that the manually collected location information can be collected before or after the connection of the device 4 to the network loop 2.

Step 4: the installation technician takes a photograph of the connected device 4 using the camera 12 of the smartphone 9 within the application so as to show that it has been installed, and also showing the environment in which it has been installed, making it easier to find later, the photograph being usable subsequently in the reporting, documenting and certifying of the installation of the system.

Step 5: the installation technician moves to the location for the second device on the loop, following the path of the loop. The technician then installs the second device in the same way as described in steps 1 to 4 above. The technician repeats this with all of the remaining devices on the loop.

Step 6: the technician connects the network loop controller to the terminals 3 of the addressable network loop, as shown in FIG. 1. Of course, it will be appreciated that this could have been carried out before step 1

Step 7: the technician turns on the Bluetooth port 8 of the network loop controller 5 and the Bluetooth port 13 of the smartphone and connects the two devices using Bluetooth protocol 14.

Step 8: the technician uploads the device information and the location information with respect to the first device installed on the loop. This information will be displayed on the display 6 of the network loop controller 5, and the technician may scroll through the information using the inputs 7.

Step 9: the network loop controller 5 allocates a device address to the device 4 which might include the number of the loop, and the position on the loop in sequence from one end of it. The technician, if unhappy with the address that is being given, is able to edit it at this point using the inputs 7.

Step 10: the network loop controller 5 then communicates with the device 4 by addressing it through the addressable network loop 2 to set the new device address in the memory of the device, together with any other information which is to be stored in the device.

Step 11: steps 8 to 10 of repeated for the other devices on the loop.

After these steps have been completed, the control panel can be installed when desired.

It will be appreciated that, steps 8 to 10 can be carried out altogether rather than one at a time. In other words, in step 8, the technician can upload the device information from all of the devices on the loop at the same time. In step 9, the technician simply has to work his way through the information for each of the devices in turn.

It should be appreciated that, whilst Bluetooth protocol has been used to permit communication between the smartphone and the network loop controller 5, other ways of enabling communication between the two devices are possible, such as by wired connection, Wi-Fi or 5G.

Figure 3:
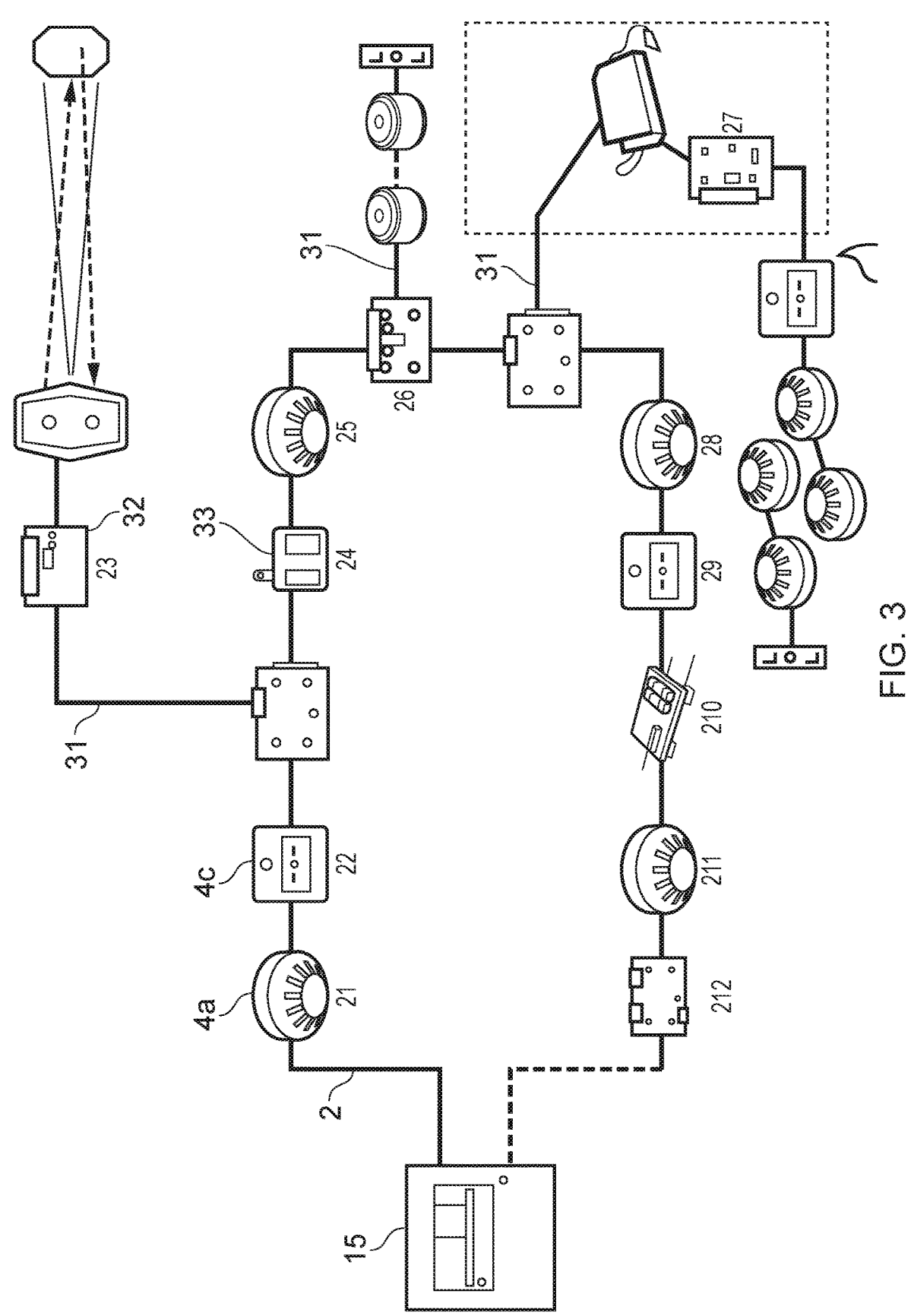
FIG. 3 is a schematic diagram of a fire alarm system in which addresses have been assigned and set in a particular order by a user in accordance with the present invention.

As a result of using the present invention and following the steps above, a fully commissioned system may be achieved, such as is shown in FIG. 3 where, a control panel 15 has been installed with a number of addressable loops as described above, of which one loop 4 is shown. For a given loop, each device has been assigned and set with a device address in a logical way where, as you trace the loop from one end to the other, the device address begins with a first digit that represents the number of the loop, followed by a number representing the sequence of that device around the loop (the sequence number). In this case, there are three spurs 31 from the loop 4 which are still part of the addressable network, and the devices on the spurs 31 have been given the sequence number immediately after the device at which the spur branches. The next item on the loop 2 receives the first sequence number after the devices on the spur have received their sequence number.

So, it will be seen from FIG. 3, that the first device in the sequence is a fire detector device 4a, which has been given the device address 21, because it is the first addressable device on the system's second loop 2. In other words, the first digit of the device address is the loop number, and the following number is the device's sequence number representing the relative position of the device on the loop when counting the devices from one end. The next device on the loop is a call point 4c, which is given the device address 22, where the second number '2' is the sequence number on the second loop, since this is the second addressable device on the second loop. The third device 32 on the loop 2 is located on a spur 31, which is part of the addressable network loop 2, and the third device 32 has the device address 23 because it is the third addressable device in the sequence. Since there are no further devices on that spur, the next device in the sequence is device 33, which receives the device address 24 because, under this sequential numbering system, it is considered to be the next device in series. The devices on the loop 2 continue to be allocated device addresses and to have those addresses set until the whole loop is addressed, in this case with the final device address 212, where the device is the twelfth device on the second loop 2.

In the specification, reference has been made to the automatic determination of the location of the point of installation of devices 4. The smartphone is described as having a geolocator within it. While such a locator could be a GPS receiver, these tend to be inaccurate inside buildings because of the presence of the building's structure. If it is determined that a more accurate system is required, a number of indoor positioning systems exist which allow people or objects to be located in the absence of a reliable GPS signal. Such systems to tend to rely on a number of transmitters located at fixed positions within the building, such as Wi-Fi or Bluetooth antennas from which a positioning receiver on the smartphone is able to locate its position.

The invention claimed is:

1. A method of setting the address of an addressable network device of a building management system, the building management system having addressable network wiring on which addressable network devices are to be installed, the method comprising:

at the point of installation of the device on the network wiring, operating a code scanner of an installation tool to scan a code on the device, the information in the code including the serial number of the device;

collecting location information in the installation tool at the point of installation;

connecting the installation tool to a network loop controller after the device has been installed;

downloading the code information and the location information onto the network loop controller;

generating, by the network loop controller, a network address for the device at least based on the downloaded location information; and setting, by the network loop controller, that network address into the device via the network wiring.

2. The method according to claim 1, wherein the code on the device is a QR code.

3. The method according to claim 1, wherein operating the installation tool involves operating an application running on a portable computing device.

4. The method according to claim 3, wherein operation of the code reader involves operation of a camera of the portable computing device.

5. The method according to claim 3, further comprising associating the location of the portable computing device when the code scanner is operated with the information in the code.

6. The method according to claim 3, wherein collecting location information involves operation of a geolocation device of the portable computing device.

7. The method according to claim 3, further comprising manually inputting data at the point of installation using a user interface located on the mobile computing device, and associating the manually input data with the information in the code.

8. The method according to claim 3, further comprising taking a photograph of the installation using a camera located on the mobile computing device, and associating the photograph with the information in the code.

9. The method according to claim 8, wherein the connection of the installation tool to the network loop controller is made by a data interface on the installation tool.

10. The method according to claim 9, wherein the data interface is a Bluetooth interface.

11. The method according to claim 10, wherein the building management system is a fire alarm system.

12. A building management system installation tool for the installation of an addressable networked building management device on a network wiring of the system, the system comprising:

a portable electronic device comprising:

a code scanner for scanning a machine-readable code information from an addressable networked building management device;

a locator for sourcing location information of the installation tool at the point of installation of the device; and a communication interface for downloading the code information and the location information to a network loop controller, and the network loop controller configured to:

generate a network address for the device based at least on the downloaded location information; and set that network address into the device via the network wiring.

13. The system of claim 12, wherein the scanner is a camera.

14. The system of claim 12, wherein the locator is one of: a GPS device; a geolocator device; and a manual user interface for manual entry of location information.

15. The system of claim 12, wherein the communication interface is a Bluetooth interface.

16. The system of claim 12, wherein the tool is a portable computing device and an application arranged to run on the device.

17. The system of claim 12, wherein the system is a fire alarm system.

18. A method of installation of a network device of a building management system, the building management system having network wiring on which devices are to be installed, the method comprising:

at the point of installation of the device on the network wiring, operating a code scanner of an installation tool to scan a code on the device, the information in the code including the serial number of the device;

collecting location information in the installation tool from a geolocator device at the point of installation;

connecting the installation tool to a network loop controller after the device has been installed; and downloading the code information and the location information onto the network loop controller, whereby the network loop controller generates a network address for the device based at least on the downloaded location information.

19. The method according to claim 18, wherein the code on the device is a QR code.

20. The method according to claim 18, wherein operating the installation tool involves operating an application running on a portable computing device.

21. The method according to claim 20, wherein operation of the code reader involves operation of a camera of the portable computing device.

22. The method according to claim 20, further comprising associating the location of the portable computing device when the code scanner is operated with the information in the code.

23. The method according to claim 20, further comprising manually inputting data at the point of installation using a user interface located on the mobile computing device, and associating the manually input data with the information in the code.

24. The method according to claim 20, further comprising taking a photograph of the installation using a camera located on the mobile computing device, and associating the photograph with the information in the code.

25. The method according to claim 24, wherein the connection of the installation tool to the network loop controller is made by a data interface on the installation tool.

26. The method according to claim 25, wherein the data interface is a Bluetooth interface.

* * * * *